May 22, 1956 R. H. HART 2,746,699
PARACHUTE
Filed Jan. 20, 1954

Inventor:
Richard H. Hart

United States Patent Office 2,746,699
Patented May 22, 1956

2,746,699

PARACHUTE

Richard H. Hart, Jacksonville, Fla.

Application January 20, 1954, Serial No. 405,169

1 Claim. (Cl. 244—145)

My invention relates to parachutes, and particularly to parachute steering and stabilizing devices involving vents formed in the parachute canopy.

The general object of the invention, broadly stated, is to provide a vented parachute functioning to achieve lessened impact shock, increased stability during descent, and steerability, without decrease in the structural strength of the parachute, and without introducing any new hazard in operation, yet demanding the minimum departure from current methods in parachute manufacture and in general parachute practice.

A principal object of the invention is the provision in a vented parachute of means to obviate undesired interference of the vent structure or any portion thereof with other parts of the parachute.

More particularly an object of the invention is the provision of obstructing or screening means whereby suspension lines or other structure associated with the parachute are prevented from passing through the opening of a canopy vent and thus becoming entangled with other parts of the parachute, though nevertheless air is allowed to pass through the vent to accomplish the specific functions of the vent.

A further object of the invention is the provision of a parachute vent construction such that the strength of the canopy is not diminished by reason of the presence of the vent.

A still further object of the invention is the provision of vent screening means so arranged as to insure maximum flexibility or mobility of the parachute canopy when the canopy is variously stressed in parachute operation.

A still further object of the invention is the provision of a parachute having vents screened and reinforced by netting, said vents being incorporated in individual gores, whereby on assembly a multiply vented overall parachute structure nearly approximating the conventional parachute structure is achieved, specifically in which the external shape, notably the length, of the individual gores is not altered.

These and other objects and advantages of my invention will become apparent through reference to the present specification and claims, taken in connection with the accompanying drawings, in which Figure 1 is a rear elevational view of the parachute in the inflated condition of a descent;

Figure 1:
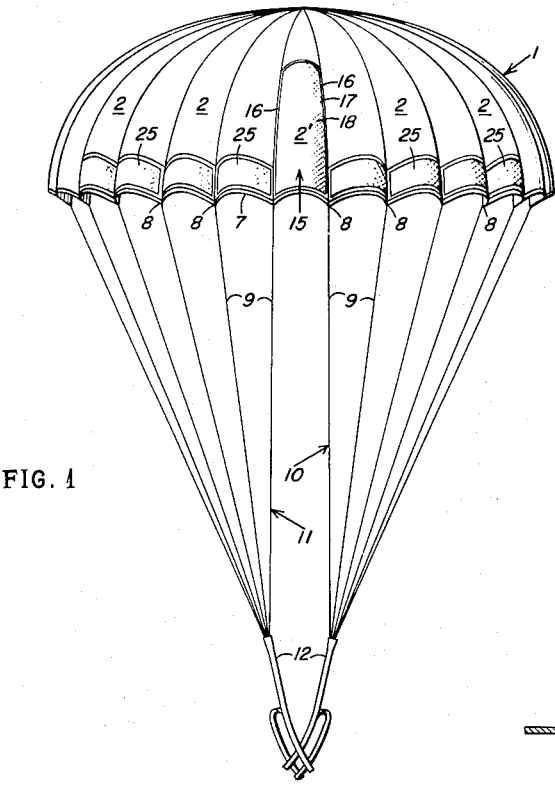

It has been found practicable to steer a parachute by means of a jet of air vented eccentrically from the canopy through an opening manipulable in such way as to change the axial direction of the vent in respect to the vertical axis of the inflated parachute. A vent of this type found very efficient in extended tests is shown in my allowed U. S. Patent Number 2,307,000; since, however, this notched or split form of vent intersects the peripheral margin of the parachute canopy, there might result a tendency to a wider extension of the canopy at the moment of inflation, resulting in a greater impact shock; moreover, the concentration of forces at the apex of the slit makes careful reinforcement necessary at that point. This undesired impact distension, as also the regional stressing of the canopy, may be obviated by the use of a framed or completely circumscribed vent, such as shown in my allowed U. S. Patent Number 2,458,264 of January 4, 1949. However, it has been urged against this latter form of vent that there is danger that parts of the suspension lines, or other rigging, even of the canopy itself, may pass through such a cut-out vent and thus become so entangled with the canopy or other parachute structure as to interfere with inflation of the canopy and imperil the life of the parachutist. It has been found by this inventor that the aperture of a vent in a parachute's canopy may be screened or covered by a sheet of open-meshed cloth or netting which will be impenetrable by suspension lines or other parts of the parachute, but which will nevertheless permit a sufficiently free flow of air therethrough to serve the purposes of steering and stabilizing the parachute.

In my aforementioned U. S. Patent No. 2,307,000, I have pointed out that, to promote a higher degree of dirigibility and stability, it is useful to supplement the horizontal thrust (as distinguished from the turning moment) generated at the steering vent by an additional thrust secured through additional vent area. One method of increasing this area is to cut away or shorten the skirt of the parachute upon one side through an extended sector contiguous to the steering vent. Though this design gives very good results as respects dirigibility and stability, it has the disadvantage of introducing a rather troublesome asymmetry into the construction of the parachute, since the gores and certain parts of the suspension lines become of unequal length, calling for additional care in manufacture and assembly, as also to some extent in refolding the parachute.

In my present invention I have obviated these disadvantages, while still retaining the aerodynamic functions of my previous construction. The vents are constituted as screened apertures formed in a selected number of gores of the parachute, the exterior dimensions of none of the gores being in any way altered, by which improvement in design, after the gores have been made, they may be assembled into a parachute, and the parachute folded and packed, according to the usual routine.

The accompanying drawings show my invention incorporated into the structure of a widely used conventional type of parachute; it is nevertheless to be understood that this showing is merely illustrative, since the invention is equally applicable to parachutes not conforming to this specific design.

Figure 2:
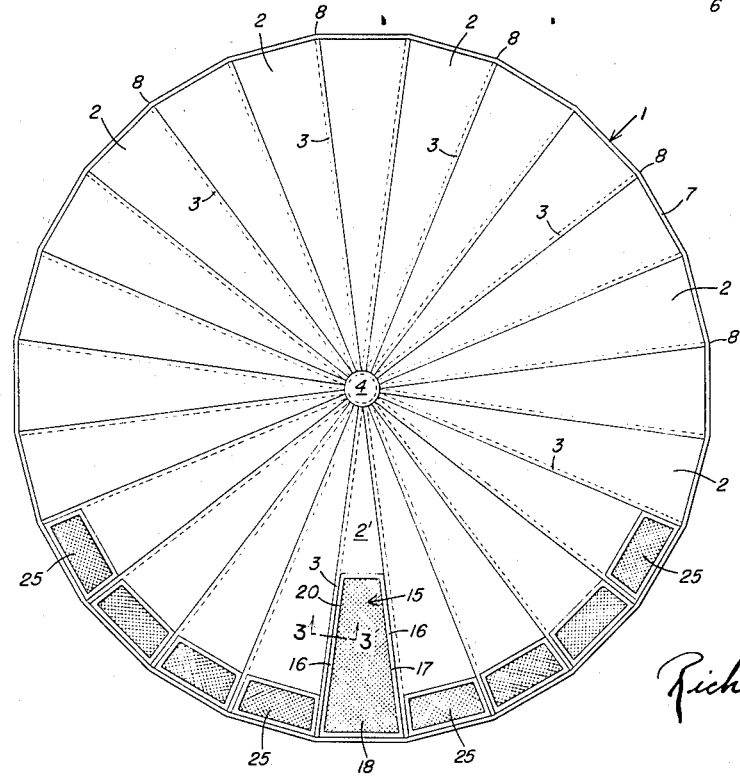
Figure 2 is a top plan view of the parachute canopy extended as a plane.

The parachute consists of a canopy 1 formed of a plurality (in this case 24) of triangular gores 2, joined together at their sides by a system of seams 3, and united at the common center or apex by either an upper lateral band or a securing patch 4, to form, when extended as a plane, a regular polygon, as clearly shown in Figure 2. Cords or shrouds 5 (Figure 3) are enclosed in channels 6 included in the seams 3. These cords extend diametrally across the canopy and are attached to the canopy near the area of their intersection at 4; they are likewise fastened at the points 8 at the outer edge of the canopy to the lower lateral band 7. The shrouds are free between these two points of attachment, riding smoothly in the channels to permit accommodation to changes in the shape and loading of the parachute. The shrouds extend beyond the canopy as suspension lines 9, being arranged in groups, two such groups 10 and 11 being visible in Figure 1. These groups of lines are separately gathered together at their lower ends and attached by means of links or D-rings (not shown) to the risers 12 forming part of the load-carrying harness.

Figure 4:
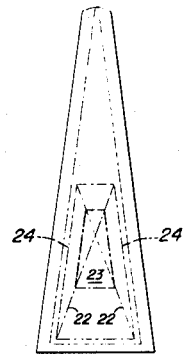
Figure 4 is a detail view showing schematically a method of laying out a parachute gore.
Figure 3:
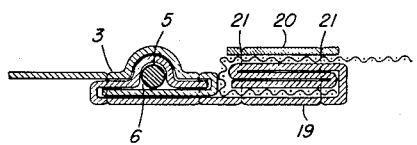
Figure 3 is an enlarged section on the line 3—3 of Figure 2, in which the direction of view is indicated by arrows, the thickness of material being greatly exaggerated, the more clearly to reveal the construction.

Incorporated into the peripheral part of that one of the gores, indicated at 2', situated at the point of division of the two groups of suspension lines 10 and 11 is a main or steering vent indicated generally at 15. This vent is formed by providing seams 16 at the edge of the vent opening 17, the seams anchoring and securing an area of mesh or porous material such as netting or gauze 18, which last covers the entire area of the vent opening, constituting a foraminiferous septum interposed between the opposed sides of this opening. In forming the seams 16 the material of the gore 2' is desirably interfolded with the material of the netting 18, in a manner well known in parachute construction. Figure 3 shows such a seam in which, illustratively, the material of the gore has been multiply folded, as shown at 19, and reinforced with tape 20 to strengthen the seam. The seam is of course secured by suitable stitching as at 21. In preparing the parachute gore for such screening and seaming, the material of the gore is cut to secure the proper vent opening and to provide integral strips of material to be incorporated into the seams. For example, the gore material may be cut along the lines 22 of Figure 4 and (if desired) cut away in the area 23, being revected along the lines 24 to form the vent opening proper 17, and further folded as at 19.

The porous septum 18 is shown as consisting of a mesh constituted of orthogonally arranged linear elements (which may be threads or fibres or integrally molded filaments of plastic material). These structural elements of the mesh are desirably oriented with their axes parallel to the axes of the threads of the material (such as silk or nylon) constituting the larger area of the individual canopy gore, this mutual arrangement of axes resulting in the minimum discontinuity in the material of the gore, forces being transmitted along the same axes and flexibility characteristics being arranged on the same axes in the two areas of the gore. Since it is common practice to arrange the weave of the parachute fabric in diagonal relation to the main axes of the gores, the webbing or netting 18 is here shown as thus oriented.

The homogeneity of the parachute may be furthered by making the material of the mesh of the same strength per dimensional unit as the fabric of the larger portion of the canopy, one method of achieving this result being to increase the cross-section of the mesh filaments in respect to those of such other fabric.

By these several means, it is provided that, although vented, the parachute gore is closely comparable as respects geometrical, endurance, and resistance characteristics to an unvented gore.

In addition to the steering vent 15, disposed more or less adjacently and symmetrically at its either side, supplemental propelling-stabilizing vents 25, constructed in the same general manner as the steering vent, but of lesser altitude than such steering vent, that is to say, extending from the vicinity of the lower lateral band not more than a foot or two toward the apex of the canopy, may if desired be provided, such supplemental propelling-stabilizing vents being of such number and dimensions that the great bulk of the air escaping from the canopy shall be vented through them and through the steering vent, upon the same side of the canopy, and little or no air shall escape beneath the peripheral margin or lower lateral band of the canopy. The effect of these vents 25 is to provide additional propulsion to the parachute, and to render it greatly more stable, resisting and damping oscillation to a highly desirable degree.

As may be seen by an examination of the details of this specification set forth above, the principles embodied in these improvements are not only applicable to the construction of new parachutes, whether flat or shaped, but may easily and economically be incorporated into parachutes previously built, thus greatly bettering their aerodynamic characteristics at extremely moderate cost.

I claim:

A parachute canopy of flexible material, such canopy being provided with venting means, such venting means being provided with screening means, such screening means allowing passage of air therethrough but being impenetrable by other parts of the parachute, a portion of such venting means being located near the periphery of the canopy and proportioned to allow escape therethrough of a considerable volume of air necessary to effect prompt steering of the parachute, and the remaining portions of such venting means being also located near the periphery of the canopy more or less adjacently and symmetrically to, but of lesser altitude than, the steering vent just described, such remaining portions of said venting means being of such number and dimensions that the great bulk of the air escaping from the canopy shall be vented through them and through the steering vent, and little or no air shall escape beneath the peripheral margin or lower lateral band of the canopy.

References Cited in the file of this patent

UNITED STATES PATENTS

| | | |
|---|---|---|
| 1,685,688 | Thornblad | Sept. 25, 1928 |
| 1,951,864 | Driggs | Mar. 20, 1934 |
| 2,307,000 | Hart | Dec. 29, 1942 |
| 2,392,946 | Quilter | Jan. 15, 1946 |
| 2,398,795 | Manson | Apr. 23, 1946 |
| 2,409,562 | Hastings | Oct. 15, 1946 |
| 2,458,264 | Hart | Jan. 4, 1949 |
| 2,527,553 | Ingels | Oct. 31, 1950 |

FOREIGN PATENTS

| | | |
|---|---|---|
| 426,231 | Italy | Oct. 23, 1947 |
| 712,806 | France | Aug. 3, 1931 |